Oct. 28, 1952

T. D. THAD 2,615,989

MAGNETIC RECORDER

Filed Oct. 2, 1948

3 Sheets-Sheet 1

Inventor
Theodore D. Thad by The Firm of Charles W. Hills Attys

Oct. 28, 1952 T. D. THAD 2,615,989

MAGNETIC RECORDER

Filed Oct. 2, 1948 3 Sheets-Sheet 2

Inventor
Theodore D. Thad by The Firm of Charles W. Hills Attys

Inventor
Theodore D. Thad by The Firm of Charles W. Hills Attys

Patented Oct. 28, 1952

2,615,989

UNITED STATES PATENT OFFICE 2,615,989

MAGNETIC RECORDER

Theodore D. Thad, Cook County, Ill., assignor to Morris Weintraub, Newport, Ky.

Application October 2, 1948, Serial No. 52,569

5 Claims. (Cl. 179—100.2)

This invention relates to magnetic recording and reproducing apparatus and more particularly to apparatus adapted for use with vending machines.

Many different forms of vending machines are employed at the present time, such, for example, as coin operated beverage dispensers, coin operated popcorn delivery machines, as well as the commonly known candy dispensers.

It is believed that such vending machines lend themselves readily to the exploitation of their own or other products or matters through short audible or visible advertisements rendered concurrently with the vending operation. Such collateral advertising material might well be monotonous or objectionable if the same material were repeated each time a coin were dropped in the machine. Furthermore, the advertising material should be complete, should start at the beginning, should finish before the machine is shut off, should be quiet between dispensing operations of the machine, and should automatically index itself.

One of the principal features and objects of this invention is to provide novel magnetic recording and reproducing apparatus which will reliably and efficiently perform the above functions.

It is a further feature and object of the present invention to provide automatic recording and reproducing apparatus of novel construction and which is combined in a novel manner with an associated piece of apparatus.

It is a further object of the present invention to provide magnetic reproducing apparatus controlled by a relay operable under the influence of a signal recorded on the magnetic record member being played by the apparatus.

It is a still further object of the present invention to provide magnetic recording apparatus controlled by a vacuum tube relay controlled by a signal recorded on the magnetic record member.

Another and still further object of the present invention is to provide a novel magnetic recording and reproducing device employing a novel magnetic record member having a signal thereon which includes both the audible material as well as a control signal for selectively energizing and de-energizing associated apparatus.

The novel features which I believe to be characteristic of my invention are set forth in the appended claims. My invention itself, however, both as to its organization, manner of construction and method of operation, together with further objects and advantages thereof, may best be understood by reference to the following description, taken in connection with the accompanying drawings, in which:

Figures 1, 2:
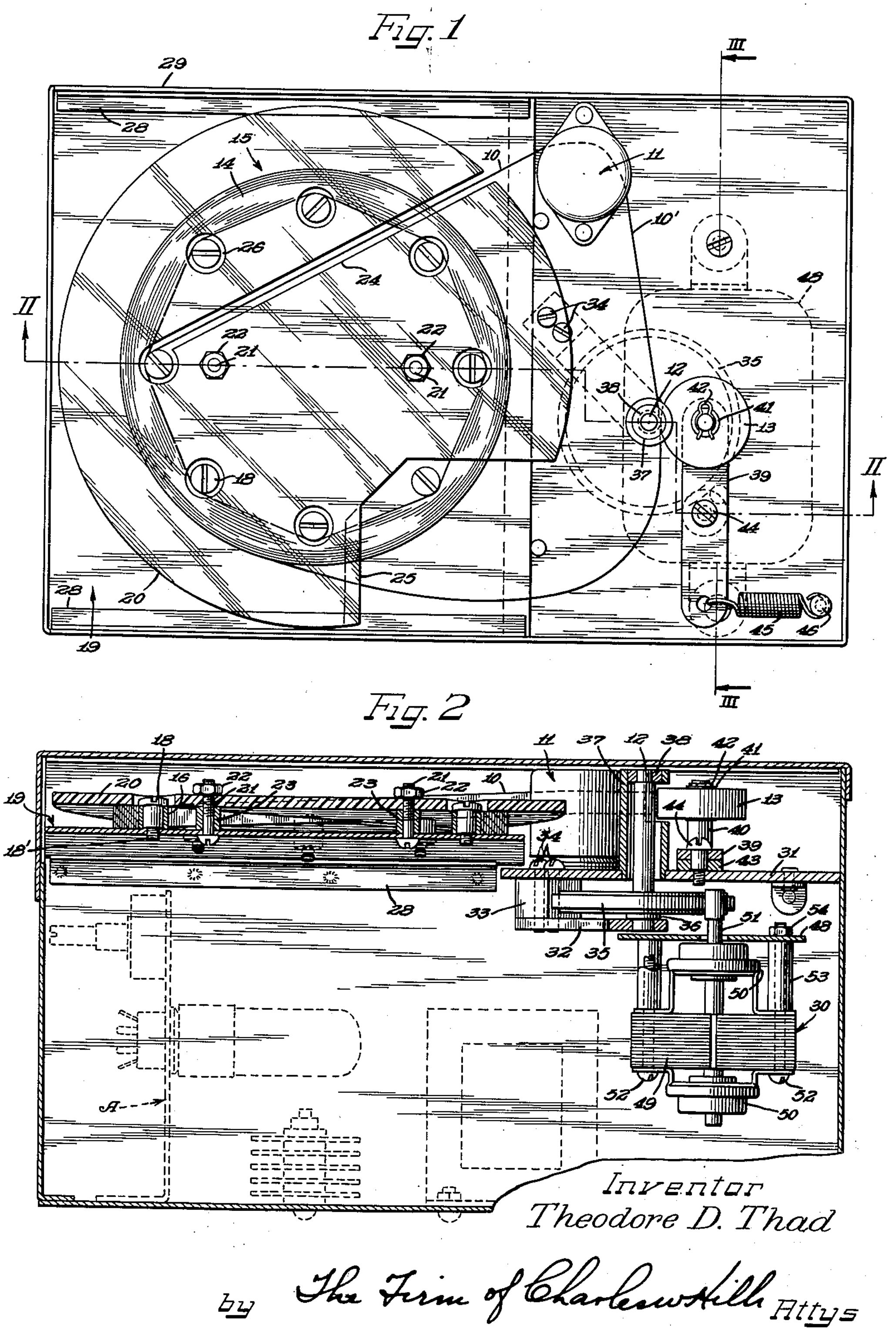
Figure 1 is a plan view of a magnetic recorder embodying the novel teachings and the principles of the present invention.
Figure 2 is a vertical sectional view of the magnetic head as well as the winding and reeling mechanism of the device shown in Figure 1 as taken along line II—II of Figure 1.

As herein used the term "magnetic recorder" shall be deemed to refer to magnetic apparatus which is arranged to perform a recording function, a reproducing function, or both.

Referring now to the embodiment of my invention illustrated in the various figures of the drawings, a magnetic recorder is shown of the endless loop single reel type. This recorder is composed of three principal component parts; namely, an electromagnetic transducer head 11 which is arranged to be engaged by a magnetic record member 10, an amplifier A, and a winding and reeling mechanism for moving the record member 10 across the head 11.

The details of the winding and reeling mechanism have been illustrated in Figures 1 to 4, and by referring thereto it will be observed that the record member 10 lies in a coil 14 about a plurality of upright rollers 16 which are supported on a panel 19 in the form of a circle. A large loop 10′ of the coiled endless record member 10 is taken at one end from the innermost layer of the coil and at the other end from the outermost layer of the coil. This loop 10′ is disposed over the head 11 and over a drive spindle 12. A pinch roller 13 presses the record member 10 into frictional driving engagement with the drive spindle 12 so that rotation of the drive spindle 12 pulls the record member 10 from the inner part of the coil 14 and over the head 11. Since continuous pulling of the record member 10 from the coil 14 at a fixed point, as determined by the roller 16 located at the point of take-off, will cause rotation of the coil 14, it will be apparent that the other end of the loop 10′ is being continually wound up on the outer part of the coil 14.

The rollers 16 may conveniently be mounted on the panel 19 by means of studs 18 which have a reduced lower end 18′ threaded into panel 19. A cover plate 20 is supported on tubular spacers or sleeves 23 and secured to panel 19 by bolts 21 extending through the sleeves 23. Nuts 22 retain the bolts in place. It will thus be observed that a compact magazine is provided by the panel 19 and the cover 20.

To enable the record member 10 to be drawn from the inner circumference toward the magnetic head 11 without interfering with the portion of the moving roll which it must pass, the whole panel 19 is mounted in a slanted position so that the portion of the roll across which the record member 10 is drawn to remove it from the inner layer of coil 14 is lower than the portion of the roll at which the record member is fed back to the outer circumference.

A slot 24 across part of retaining wall or cover 20 provides a clear path for record member 10 as it leaves the inner circumference of record roll 14 to be drawn past one side of the record roll out of retainer 15 to the magnetic head 11.

As shown in Figure 1, a portion of the retaining wall 20 is cut away for a distance adjacent the region of the slack in record member 10 (which occurs between drive spindle 12 and the point where the member 10 is returned to the coil 14). A chamfer 25 is provided at the edge of the cut-away portion in retaining wall 20 nearest the point where the record member 10 is fed to the outer circumference of roll 14, the chamfer being so made that the inner surface of the retaining wall is cut further back from the sharper or outer edge, thus providing a smooth uninterrupting guide surface for the record member as it is wound on roll 14. Such a chamfer also aids in preventing abrasive action of the record member 10 against what ordinarily would be a blunt inner edge on the inner surface of the retaining wall 20. Circular holes 26 are provided in the retaining wall at each point where heads of bolts 18 are located so that adjustment may be made for friction of the heads of the studs 18 against the sides of rollers 16.

Panel 19, on which retainer 15 is mounted, is held between angle brackets 28 welded to the sides of cabinet 29. Elements of the electrical circuit for the magnetic recorder, such as tubes, rectifiers, transformers and volume control, are conveniently located in the space below panel 19.

The record drive spindle 12 is mounted in an upright position in a second panel plate 31 adjacent panel 19 and is journaled at each end as shown in Figure 2. The lower journal is provided by bracket 32 extending in a plane parallel to panel plate 31 from bracket spacer 33. Both journal bracket 32 and spacer 33 are secured in fixed position by bolts 34 screwed into threaded mounting holes provided in brackets 32. A friction drive wheel 35 is fixed to one end of drive spindle 12 and is disposed in a position adjacent the lower journal bracket 32 with a thrust washer 36 being provided between the wheel and lower journal. The upper end of drive spindle 12 is surrounded by a tubular housing 37 fixed in an upright position on panel plate 31 with a journal 38 for the end of spindle 12 inserted in the upper end of the tube. A portion of the tube just below the journal 38 is cut away to allow the record member 10 to come into engagement with the drive spindle 12. The cutway portion is made sufficiently large to enable the pinch roll 13 to fit within the opening so that it may provide the pressure necessary to create the frictional engagement between the record member and drive spindle.

The pinch roll 13 which is made of resilient friction material, such as rubber formed on a suitable metal core 41, is rotatably mounted on a vertical spindle 40 which passes through its metal core 41 and which is fixed to one end of pinch roll arm 39. Both pinch roll 13 and retaining washer 41 are held in place by a retaining spring 42 clipped over the top of the pin 40. The pinch roll arm 39 is held above panel plate 31 by spacer 43 at its pivot point. The pivot for the pinch roll arm is provided by pivot bolt 44 which passes through a hole near the center of the arm and through supporting spacer 43 and is threaded into panel plate 31. The entire arm with the pinch roll is thus movable about its pivot point, and tension spring 45 stretched between fixed pin 46 mounted in panel plate 31 and engaging hole 47 at the end of the pinch roll arm opposite to that where the pinch roll is mounted, provides the force necessary to bring the pinch roll 13 into pressure engagement against the record member 10.

The drive motor 30, mounted on a pivoted mounting bracket 48, is a conventional type frequently used in driving phonograph equipment and consists of a laminated magnetic yoke 49 with end brackets 50 which provide the bearing support for drive shaft 51. The motor is mounted with its driving end in an upright position protruding through a hole in bracket 48 so that the driving end of the drive shaft is disposed in a position close to the friction drive wheel 35. The motor is secured to bracket 48 by means of support bolts 52, two of which successively pass through ear holes in end brackets 50, through the laminations of the magnetic yoke, through motor spacers 63, and then through holes in support bracket 48 where they are held by means of securing nuts 54. Two similar support bolts 52 pass only through the laminations and motor spacing tubes 53 before passing through holes in bracket 48 to be held in position by nuts 54.

Figure 3:
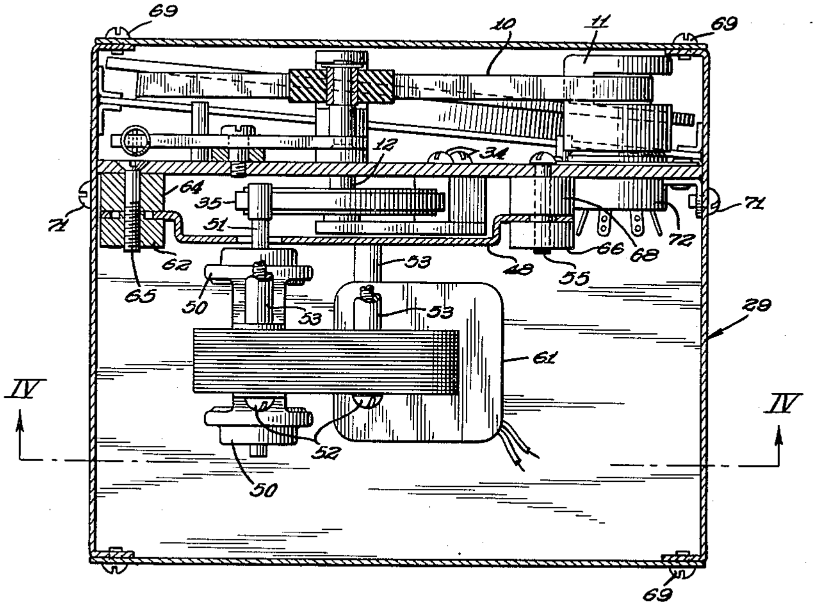
Figure 3 is a vertical sectional view of the device shown in Figure 1 as taken along line III—III.

Motor support bracket 48, as shown in Figure 3, is pivoted at one end on pivot bolt 55 to allow a slight movement of the bracket 48 so that the drive end of the motor shaft 51 can be moved into position under pressure against the friction surface of friction drive wheel 35 for drive spindle 12. The force required for such pressure engagement is provided by tension spring 58 stretched between fixed pin 59 and engaging ear 60 at one corner of pivoted motor mounting bracket 48. The spring 58 thus exerts a pulling action on motor mounting bracket 48 until the drive end of shaft 51 engages friction drive wheel 35. Motor 30 is energized by field coil 61. Drive shaft 51 turns drive spindle 12 through friction drive wheel 35. The swinging movement of bracket 48 about pivot 55 is provided to reduce the need for exacting tolerances of driving surfaces and to enable drive shaft 51 to maintain proper engagement with drive wheel 35 as their contacting surfaces wear away. The limitation in such movement exists in the proportions of a circular spacer 62 which has a small circular neck portion concentric with its axis projecting into an end hole 63 of bracket 48, the neck portion being smaller in diameter than the diameter of the hole in which it projects. Spacing disks 62 and 64 are held together and secured to panel 31 by a holding screw 65 threaded through their centers. Thus the groove between the two spacing disks 62 and 64 provides a shelf or supporting means for one end of the bracket 48, and the narrow neck portion of spacer 62 allows room for swinging movement of that end of the bracket. The pivot end of bracket 48 is held between two spacer supports 66 and 68 secured in mounted position on panel 31 by pivot bolt 55 threaded through their centers.

Figure 4:
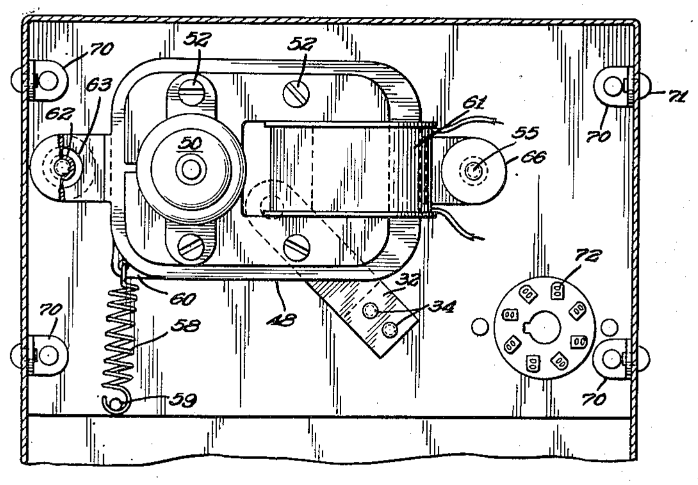
Figure 4 is a bottom fragmentary sectional view as taken along line IV—IV of Figure 3.

The general manner in which cabinet 29 is constructed and held together by bolts 69 threaded into the wall joints is shown in Figures 3 and 4. Supporting angle brackets 28 are also shown slidably supporting panel 19 in slanted position. Panel plate 31 is supported by lugs 70 riveted to the edges of its under surface so that panel support bolts 71 screwed from outside the enclosure through the enclosure walls may be threaded into lugs 70 to secure the panel plate 31 in horizontal position. Socket base 72 for magnetic head 11 is shown to be a standard type eight lug socket.

Figures 5, 6, 7, 8:
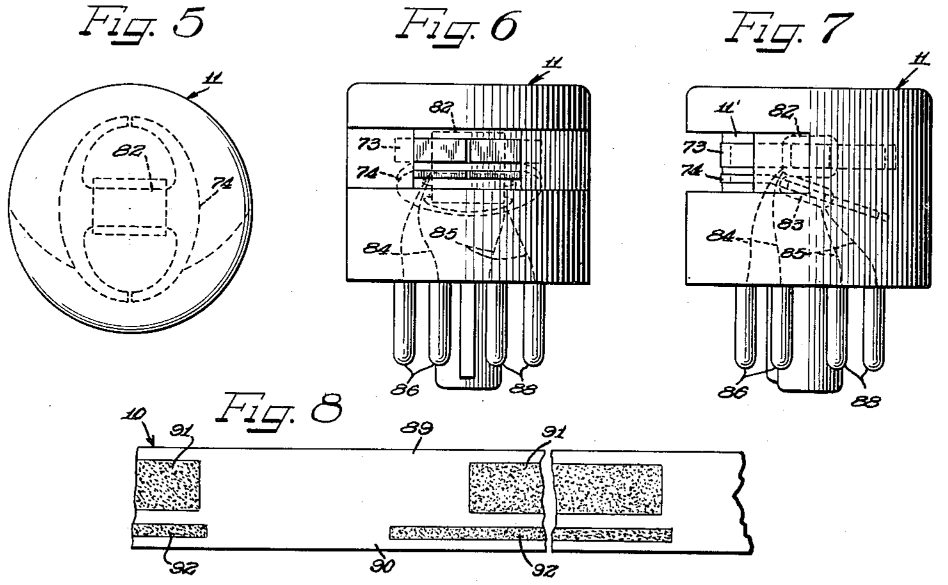
Figure 5 is a top view of the electromagnetic transducer head assembly of the device shown in Figure 1.
Figure 6 is an elevational view of the head magnet shown in Figure 5 toward the surface thereof over which the record member passes.
Figure 7 is an elevational view of the head taken at right angles to the view shown in Figure 1 showing the cut-away portion in the housing which provides the path for the magnetic record member.
Figure 8 is a fragmentary diagrammatic view of the magnetic record member with its main and auxiliary magnetic tracks indicated thereon.

Figures 5, 6 and 7 show in greater detail the assembly and construction of magnetic head 11. Two laminated electromagnetic transducer heads 73 and 74 each having a configuration, somewhat like two confronting C-shaped members joined at their centers by a cross member, are disposed one above the other within the housing of the unit. Two gaps are thus provided in each head, one being an active gap for recording, erasing and picking up material on the record with which the head is associated. Signal coils 82 and 83 are wound on the cross members between the confronting C-shaped members of the main and auxiliary heads 73 and 74 respectively. A substantial portion of yoke or head 74 is bent down at a slight angle from a point immediately in front of its signal coil 83 to provide additional room between the two coils 82 and 83 and to prevent leakage flux interaction between them.

The active gaps of each of the transducing heads 73 and 74 are aligned one above the other and protrude slightly from their curved non-magnetic supporting surface 11' mounted within the housing of head 11 opposite the cut-away portion thereof. Leads 84 from the main recording head 73 are connected to a pair of prongs 86 in the base of the unit 11, while the leads 85 from the smaller recording head are connected to a pair of similar prongs 88. In mounted position, magnetic head 11 is plugged into socket base 72 which thus has only four of its eight lugs in use.

The record member for use with the electromagnetic transducer head assembly 11 is of the tape type and may be made of a cellulose acetate base or a paper coated with magnetizable material. One entire surface of the tape may be coated, but only the portions thereof which pass over the gaps of the heads 73 and 74 would be effective as magnetic record tracks. These active regions of the record member, for convenience, will be referred to as tracks. As shown in Figure 8, both a wide main recording track 89 and a narrow control recording track 90 are provided corresponding to magnetic heads 73 and 74 respectively. The main or wider magnetic head 73 is used to record and reproduce audio signals on and from track 89, while the narrower track 90 and its associated head 74 are used for recording and picking up control signals or coordinating signals for the magnetic recorder when it operates in conjunction with other equipment.

When the device as illustrated is to be used in a vending machine to reproduce a series of selected short energizations, one for each vending operation, longitudinally spaced portions 91 of track 89 are magnetized with the selected programs of bits of advertising to be reproduced. These spaced magnetized portions of track 89 are diagrammatically suggested in Figure 8.

Each bit or program has associated with it a control signal along the parallel control track 90. For a reason which will presently be apparent, the length of the region of a control signal along its track is preferably greater than its associated audible program. The control signal thus appears before the program is reached and extends for a short distance beyond it.

Figure 9:
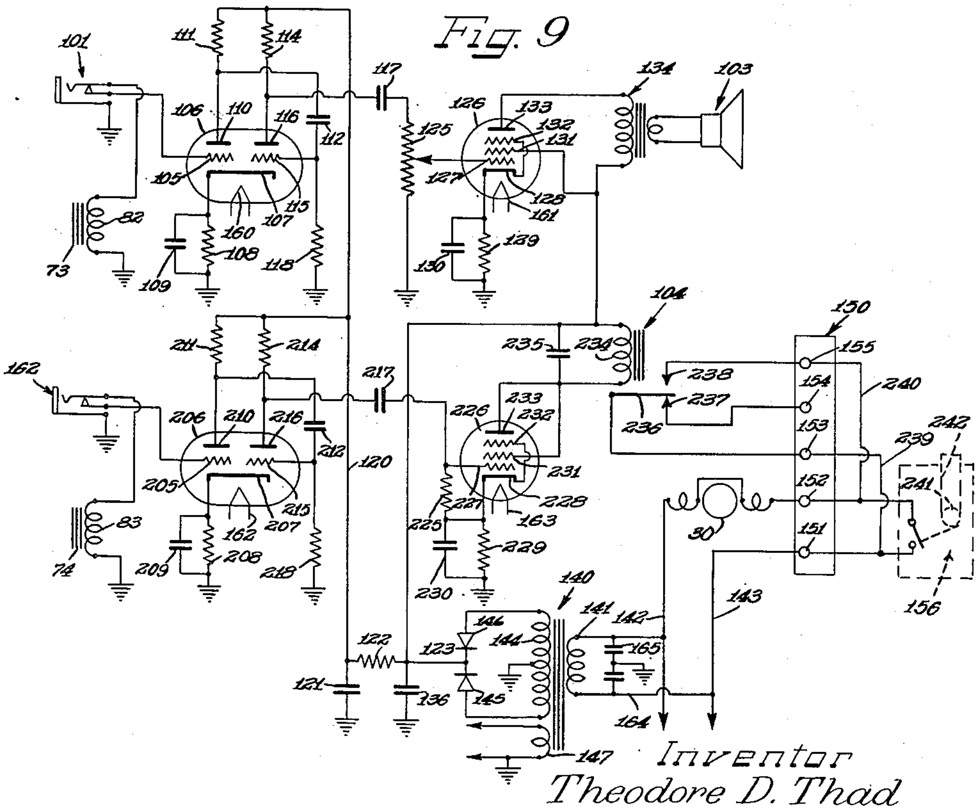
Figure 9 is a schematic diagram of the circuit used in the magnetic recording and reproducing apparatus shown in Figure 1.

The electrical circuit of the magnetic recorder of Figure 1 is shown in Figure 9 and includes an amplifier and a vacuum tube relay which controls the energization and deenergization of the recorder. The circuit may be easily traced from left to right in the drawing beginning with the two magnetic heads 73 and 74.

One of each of the magnetic heads 73 and 74 is connected to ground while the other end of each is connected to plug jacks 101 and 102 respectively. By means of the plug jacks, equipment used in recording material on the record member 10 may be plugged into the circuits for each of the magnetic heads 73 and 74 to effect such recording. When recording is completed, the plugs are pulled out of the jacks and the playback apparatus or equipment shown in the circuit of Figure 9 is arranged for operation. The circuit has two separate amplifiers making use of a common plate power supply. The output of the amplifier cooperating with magnetic head 73 is connected to a loud speaker 103 while the output of the amplifier cooperating with recorder head 74 is connected to a control relay 104. Each amplifier has a triple stage of amplification, the first two stages taking place in a double triode input amplifier tube and the third in a final amplifying pentode tube.

When no plugs are in place in jacks 101 and 102, the signal induced in magnetic head 73 is fed directly to a first control grid 105 of a double triode tube 106. This tube is cathode biased by connecting its cathode 107 to parallel connected biasing resistor 108 and by-pass condenser 109 which are grounded at their other terminals. The first plate 110 associated with grid 105 is connected to the junction of a current limiting plate load resistance 111 and coupling condenser 112 for coupling the output signal from the first plate of tube 106 to second control grid 115. Control grid 115 is associated with the second plate 116 connected to the junction between plate current limiting resistance 114 and coupling condenser 117 for the third stage of signal amplification. The second control grid 115 of tube 106 besides being connected to coupling condenser 112 is connected to grid resistance 118 which has its other terminal grounded. Both the current limiting plate load resistances 111 and 114 have their free ends joined to lead 120 which is connected to a suitable plate bias source through a voltage dropping resistance 122 and which is here illustrated as the output lead 123 of a direct current power supply. Filter condensers 121 and 136 are connected between the opposite ends of resistance 122 and ground.

The amplified signal from tube 106 is coupled to a third stage of amplification through coupling condenser 117 which is connected to a voltage dividing input resistance 125. The other end of the voltage dividing resistance 125 is connected to ground, while the variable positioning arm is connected to the control grid 128 of the final amplifying tube 126.

Tube 126 amplifies the signal fed to its control grid 127 and the amplified signal generated on its plate 133 is fed to the primary winding of the output transformer 134 which has its other primary terminal connected to screen grid 131 and to the plate bias source. Tube 126 is cathode biased by connecting cathode 128 thereof to biasing resistance 129 with its parallel connected bypass condenser 130 which have their other terminals grounded. The suppressor grid 132 is directly connected to cathode 128 in conventional manner. The secondary of the output transformer 134 is connected to a loudspeaker 103 which reproduces the audible signal recorded on the magnetic record member 10 passing over the air gap of magnetic head 73.

Similarly when the narrow track 90 of record member 10 passes over the air gap of magnetic head 74, the recorded material 92 induces a control signal in the coil 83 which is fed to first control grid 205 of double triode tube 206. Tube 207 is cathode biased through cathode biasing resistance 208 connected in parallel with bypass condenser 209 which both have their other terminals connected to ground. Plate 210 is connected to the junction point of one terminal of plate current limiting resistance 211 and coupling condenser 212, while plate 216 is connected to the junction point of one terminal of plate current limiting resistance 214 and coupling condenser 217. The free terminals of current limiting resistance 211 and 214 are then joined and connected to power supply lead 120. The second control grid 215 receives an amplified signal from plate 210 through coupling condenser 212. The junction point between control grid 215 and coupling condenser 212 is connected to ground through grid resistance 218. The amplified signal from plate 216 is fed through coupling condenser 217 to control grid 227 of the third and final stage of amplification in second tube 226 and which tube 226 forms a part of vacuum tube relay.

The cathode 228 of tube 226 is biased through biasing resistance 229 and by-passing condenser 230 which both have their other terminals connected to ground. A grid resistance 225 is connected between control grid 227 and cathode 228. The suppressor grid 232 is connected directly to cathode 228, while screen grid 231 is connected to plate 233. The final amplified signal from plate 233 of tube 226 is fed to the relay actuating coil 234 which has a condenser 235 connected across its terminals. The other terminal of relay coil 234 is connected to the plate bias lead 123. One convenient form of power supply is shown which comprises a power transformer 140 which has its primary 141 connected across alternating current power supply lines 142 and 143. The transformer 140 has two secondary windings, one a grounded center tapped winding 144 which has its end terminals each connected to rectifiers 145 and 146 respectively, which are in turn joined at their other terminals to lead 123 in a manner to provide full wave rectification and to furnish a D. C. supply voltage for each of the tubes 106, 126, 206 and 226. Rectifiers 145 and 146 may be of any suitable common type, such as copper oxide or selenium plate rectifiers.

A second winding is provided on transformer 140 which acts as the filament winding 147. One leg of this winding is grounded and both legs run to each of the tube filaments 160, 161, 162 and 163 respectively. To prevent undesirable signals from being fed to the amplifier circuits, filter condensers 164 and 165 are connected in series across the primary winding 141 of power transformer 140 and are center tapped to ground, thus providing a filter for voltage supplied by lines 142 and 143.

When record member 10 is driven over the gaps of recording heads 73 and 74, the cycle of recorded material on the main track 89 is amplified and reproduced in loudspeaker 103 while the control signal recorded on the narrower track 90 is amplified and fed to relay coil 34 to pick up movable contact arm 236 of relay 104.

The drive motor 30 is connected to one side of the alternating current power supply, namely, conductor 142, and to terminal 152 on terminal block 150. The other side of the power supply, namely, conductor 143, is connected to terminal 151 on terminal block 150.

The relay 104, in addition to its movable contact 236, is provided with lower and upper stationary contacts 237 and 238 which are connected to terminals 154 and 155 on terminal block 150. Movable contact 236 is connected to terminal 153 on block 150.

A jumper 239 directly connects terminals 151 and 153. A second jumper 240 directly connects terminals 152 and 155.

The movable contact 236 is normally biased against the lower relay contact 237 when the relay is in a deenergized condition. Energization of the relay by flow of plate current in the tube 266 picks up contacting arm 236 and moves it into engagement with stationary relay contact 238.

The termination of electrical elements on terminal block 150 enables the magnetic recording apparatus to be adapted to numerous applications in which the recorder may be made to cooperate with associated apparatus. As previously pointed out, the recorder is particularly suited and adapted for use with a coin vending machine, and its operation initiated by dropping a coin in a slot.

The coin operating mechanism of the vending machine forms no part of the present invention, for any conventional form may be used in conjunction with the present apparatus. It is sufficient to point out and diagrammatically show that a coin operated time delay switch 156 is connected between terminals 151 and 152 on block 150. Coin operated time delay switches commonly found in vending machines usually remain closed for around eight seconds, or, in other words, for a time sufficient to perform the required vending operation.

When a coin 241 is dropped into a slot 242 it closes switch 156 and thus energizes motor 30. The time delay switch should have a sufficient interval during which it is closed to enable the drive motor 30 to advance the record member 10 until the next recorded control signal 92 is reached. As soon as this signal is detected by magnetic head 74, current starts to flow in the plate circuit of tube 226, and since this is in series with relay coil 234 the movable contact 236 of this relay closes against contact 238. Since the relay contacts 236 and 238 parallel the coin operated switch 156, it will be apparent that the motor 30 remains energized as long as relay 234 is energized even though the coin switch 156 opens. As the motor continues to run, the record member 10 is advanced across the two heads 73 and 74. As the track portion 91 having the program or advertisement thereon passes head 73 it is picked up and reproduced through speaker 103.

Since the recorded control signal 92 lasts longer than the program 91, a quiet portion of the track 89 is reached before the relay 234 is deenergized by there being no further control signal on track 90. Opening of the relay contactor arm 236 from its associated stationary contact 238 deenergizes driving motor 30, and travel of the record member is suspended until the next coin is dropped in the slot 242. This again closes switch 156 and energizes motor 30 long enough to advance record member 10 until the next control signal 92 is reached.

From the above it will be apparent that the coin switch initiates operation of the recorder drive mechanism but the control signal on the tape acts as the holding circuit therefor and determines the length of the time the recorder continues to operate. Thus successive programs may be of variable length without in any way affecting the operation of the recorder, it simply being necessary to record a control signal of the same, or slightly longer, length than the recorded program.

The free contact point 237 of relay 104 which is connected to terminal 154 of the terminal 150 may be used in the switching of associated apparatus at times when relay contactor arm is in its lower position. Thus material recorded on the main recording track 89 of record member 10 will be reproduced for a period governed by the length of the control signal on track 90, and steps of operation in an associated piece of apparatus may be initiated or terminated at the same instant when control signals on track 90 energizes or deenergizes relay 104.

While I have shown the relay 104 as being energized from a separate control signal, it will be realized from the foregoing description that if the recorded program 91 does not have any appreciable periods of silence, the relay coil 234 may be connected in the plate circuit of tube 126 and the use of a separate control signal dispensed with. It has been found in practice, however, that most advertising material is of such a character that a separate control signal is highly desirable.

While I have shown a particular embodiment of my invention, it will, of course, be understood that I do not wish to be limited thereto, since many modifications may be made, and I therefore, contemplate by the appended claims to cover all such modifications as fall in the true spirit and scope of my invention.

I claim as my invention:

1. A magnetic recorder comprising a pair of electromagnetic transducer heads each having an output circuit connected thereto, a magnetic tape record member having a recorded audio signal on predetermined portions thereof and a recorded control signal on predetermined portions thereof in parallel spaced relation to said audio signal portion and at least coextensive therewith, winding and reeling mechanism for moving said record member at substantially uniform velocity across said heads, means for energizing said winding and reeling mechanism, a first switch in series with the energizing means, an auxiliary circuit connected in parallel with said first switch and having a second switch therein, means operable by the reprodutcion of the control signal to close said second switch, whereby said first switch may be closed to initiate operation of said winding and reeling mechanism and whereby said second switch will thereafter remain closed to continue energization of said winding and reeling mechanism as long as said recorded control signal portion of said record member is traveling over its associated head.

2. A magnetic recorder comprising a pair of electromagnetic transducer heads each having an output circuit connected thereto, a magnetic tape record member having a plurality of different recorded programs magnetically recorded thereon over longitudinally spaced regions of said record member, said record member also having a continuous recorded control signal on longitudinally spaced portions of said record member and in parallel spaced relation to said programs there being a control signal portion opposite each recorded program and each control signal extending beyond each end of the recorded program portion, winding and reeling mechanism for moving said record member at substantially uniform velocity across said head, means for energizing said winding and reeling mechanism, a first switch in series with the energizing means, an auxiliary circuit connected in parallel with said first switch and having a second switch therein, means operable by the reproduction of the control signal to close said second switch, whereby said first switch may be closed to initiate operation of said winding and reeling mechanism and whereby said second switch will thereafter remain closed to continue energization of said winding and reeling mechanism until after the recorded program associated with that particular recorded signal portion has been completed.

3. A magnetic recorder comprising an electromagnetic transducer head having an output circuit connected thereto, a magnetic record member having a recorded signal on predetermined portions thereof, winding and reeling mechanism for moving said record member at substantially uniform velocity across said head, said winding and reeling mechanism having an energizing circuit with a relay controlled switch therein, an auxiliary circuit connected in parallel with said relay switch and having a time delay switch therein, the time delay of said time delay switch being substantially shorter than the time required for the recorded signal portion of said record member to cross said head, a relay for said relay switch in the output circuit of said head, whereby said second switch may be closed to initiate operation of said winding and reeling mechanism and whereby said relay switch will thereafter remain closed to continue energization of said winding and reeling mechanism as long as the recorded signal portion of said record member is traveling over said head.

4. In combination in magnetic recording apparatus a magnetic unit having two electromagnetic transducing heads, a record member having a pair of recorded channels, one of said channels having audio signals recorded thereon and the other of said channels having a control signal recorded thereon, each of said channels being in operative engagement with one of said transducing heads, an amplifier for audio frequency signals picked up by one of said transducer heads and an electromechanical transducer for reproducing said signals as sound, an amplifier of control signals picked up by the other of said electromagnetic transducer heads and a relay operated by said amplified signals, a drive motor for said recording device, a source of alternating current power, said drive motor in series with said relay, and means connecting said series connected elements across said power supply whereby said motor is energized at said times when said relay is operated.

5. In combination in a vending machine, a magnetic recording device comprising a magnetic unit having two electromagnetic transducer heads, a magnetic record member having a pair of recorded channels thereon, one of said channels having audio frequency signals thereon and the other channel having control signals thereon, each of said channels being in operative engagement with one of said transducer heads, an amplifier for audio frequency signals picked up by one of said electromagnetic transducer heads, an electromechanical transducer for reproducing said signals as sound, an amplifier for control signals picked up by the other of said electromagnetic transducer heads, a drive motor for said recording device, a source of alternating current power, a coin-operated switch, time-delay means including a relay connected in parallel with said switch and in series with said motor, means connecting the output of the control signal amplifier to said relay to control operation of said relay, means connecting said motor across said power supply whereby a coin dropped into said coin-operated switch will close said switch and energize said motor for a period until control signals are picked up by the other of said electromagnetic transducer heads to energize said relay.

THEODORE D. THAD.

REFERENCES CITED

The following references are of record in the file of this patent:

UNITED STATES PATENTS

| Number | Name | Date |
|---|---|---|
| 1,560,721 | O'Reilly | Nov. 10, 1925 |
| 1,916,867 | Rhodes | July 4, 1933 |
| 2,096,020 | Adair | Oct. 19, 1937 |
| 2,100,434 | Davis | Nov. 30, 1937 |
| 2,196,730 | Hooker | Apr. 10, 1940 |
| 2,214,482 | Schmidt | Sept. 10, 1940 |
| 2,272,821 | Roys | Feb. 10, 1942 |
| 2,344,541 | Ferris | Mar. 21, 1944 |
| 2,356,145 | Begun | Aug. 22, 1944 |
| 2,396,409 | Berzer | Mar. 12, 1946 |
| 2,401,632 | Greenleaf | Jan. 4, 1946 |
| 2,411,849 | Camras | Dec. 3, 1946 |
| 2,413,108 | Latchford | Dec. 24, 1946 |
| 2,419,476 | Begun | Apr. 22, 1947 |
| 2,443,756 | Williams et al. | June 22, 1948 |
| 2,469,750 | Sunstein | May 10, 1949 |

FOREIGN PATENTS

| Number | Country | Date |
|---|---|---|
| 227,380 | Switzerland | Sept. 1, 1943 |
| 441,479 | Great Britain | Jan. 13, 1936 |